United States Patent [19]

Laber et al.

[11] 4,170,263
[45] Oct. 9, 1979

[54] TUBE SHEET CONNECTION TO VESSEL CONTAINING A BUNDLE OF TUBES

[75] Inventors: Walter Laber; Rudolf Vogl, both of Deggendorf; Wolfgang Fahrnschon, Frankfurt am Main, all of Fed. Rep. of Germany

[73] Assignee: Deggendorfer Werft und Eisenbau GmbH, Deggendorf, Fed. Rep. of Germany

[21] Appl. No.: 836,418

[22] Filed: Sep. 26, 1977

[30] Foreign Application Priority Data

Sep. 23, 1976 [DE] Fed. Rep. of Germany ....... 2642800

[51] Int. Cl.$^2$ .............................................. F28F 9/00
[52] U.S. Cl. .................................... 165/158; 122/512
[58] Field of Search .................. 176/65, 78, 79, 87; 165/158-162, 140, 141, 134; 29/157.4; 285/137 R, 18, 19, 187; 122/32, 34, 511, 512

[56] References Cited

U.S. PATENT DOCUMENTS

| | | | |
|---|---|---|---|
| 3,258,068 | 6/1966 | Hollister | 165/158 |
| 3,683,866 | 8/1972 | Zmola | 165/162 |
| 3,863,713 | 2/1975 | Tramontini | 165/158 |
| 3,982,585 | 9/1976 | Gribsvad | 165/158 |

Primary Examiner—Samuel Scott
Assistant Examiner—Theophil W. Streule, Jr.
Attorney, Agent, or Firm—Toren, McGeady and Stanger

[57] ABSTRACT

In a heat exchanger or similar apparatus using a tube bundle, the tubes are located within a jacket and are connected into a tube sheet. An annular reinforcing member secures the tube sheet to the jacket laterally enclosing the tube bundle. The reinforcing member consists of an inner part and an outer part which can be a unitary member or separate parts welded together. The outer part forms a continuation of the jacket and has a greater thickness than the jacket. The inner part extends radially outwardly from the circumferential periphery of the tube sheet to the outer part and has a frusto-conical shape extending outwardly from at least one of the face surfaces of the tube sheet transversely of its radial direction.

10 Claims, 10 Drawing Figures

TUBE SHEET CONNECTION TO VESSEL CONTAINING A BUNDLE OF TUBES

SUMMARY OF THE INVENTION

The present invention concerns large dimensioned tubular heat exchangers and similar apparatus operating under high design pressures and, more particularly, is directed to a reinforcing member for connecting the tube sheet to the tubular jacket of the heat exchanger.

In such large dimensioned tubular heat exchangers, in accordance with conventional strength calculations, extensive tube sheet thicknesses are required. Such tube sheet dimensions involve considerable economic and engineering drawbacks, since the required circular blanks in forged shapes cannot be supplied for dimensional and weight reasons and instead the blanks have to be welded together from half blanks in rolled shapes. Additionally users of such apparatus must take into account high U.S. testing costs and the considerable drop in minimum yield strength (from 60 mm=1% for each 5 mm in thickness). Furthermore, with large tube sheet thicknesses, allowance must be made for considerable drilling costs and off-centered drill holes, out-of-round drill holes and excessive tolerances.

The present invention is based on the concept, which is well known, that maximum stresses are produced in the circumferential peripheral region of tube sheets, because at that location the operational forces must be transmitted from the flat tube sheet via a connection to the jacket encircling the tubes and the tube sheet. In the remaining inner area of the tube sheet the tensile and compressive forces can be absorbed by the tubes. Accordingly, this tube sheet does not have to be dimensioned for the forces occurring within its inner area, however, provision must be made for a sufficient attachment or support of the tubes in the tube sheet. This requirement can be met by sufficient weld cross-sections, rolling-in of the tubes, deflectors, supporting rings or by built-in grids.

Therefore, the primary object of the present invention, is to provide an adequate connection between the tube sheet and jacket, taking into account the forces experienced in the boundary region of the tube sheet, while using a membrane-like tube sheet of comparatively reduced thickness.

While vessels containing relatively thin tube sheets having a uniform thickness have been known, such tube sheets have been anchored by tension rods distributed around the entire inner diameter of the vessel. These tension rods are suspended at their ends opposite the tube sheet in a domelike bonnet having a concave curvature relative to the tube sheet. The bonnet is supported on a flange formed on the vessel.

In this design, the stress on the tube sheet produced by the extremely high temperature differential between hot gases on the outside of the sheet and the coolant on its inside, will be reduced. In this way, the tube sheet is very intensively cooled by the coolant fed into the space between the tube sheet and the bonnet and is under high pressure directed against the tube sheet.

By comparison, the present invention intended for the solution of the above problem is based on other considerations and conditions and consists of a tube sheet which is connected to the vessel or jacket by a reinforcing member extending radially outwardly from the circumferential periphery of the uniform thickness tube sheet and forming a reinforced part of the vessel.

The term "membranelike" as used herein refers to a relatively thin tube sheet the thickness dimension of which is not calculated and dimensioned according to the (high) over-pressure on one side of the tube sheet by accounting for the (large) tube sheet diameter.

The annular reinforcing member extending around the circumferential periphery of the tube sheet has a frusto-conical configuration which extends outwardly from the tube sheet transversely of its radial direction either toward or away from the bundle of tubes depending on whether a higher pressure is present in the space surrounding the tubes or within the tubes themselves. In any given case the annular reinforcing member can be provided with a frusto-conical configuration extending from both sides of the tube sheet.

The annular reinforcing member consists of an inner part having the frusto-conical configuration and connected to the tube sheet and an outer part connected to the vessel or jacket. In a preferred embodiment, the inner and outer parts of the reinforcing member are formed as a unitary member welded to the circumferential periphery of the tube sheet. Alternatively, the frusto-conically shaped inner part can be welded to the tube sheet and in turn welded to the outer part forming a reinforced section of the vessel or jacket.

In another embodiment, the frusto-conically shaped inner part can be formed by buildup welding on the outer part which forms a reinforcement of the vessel.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figure 1:
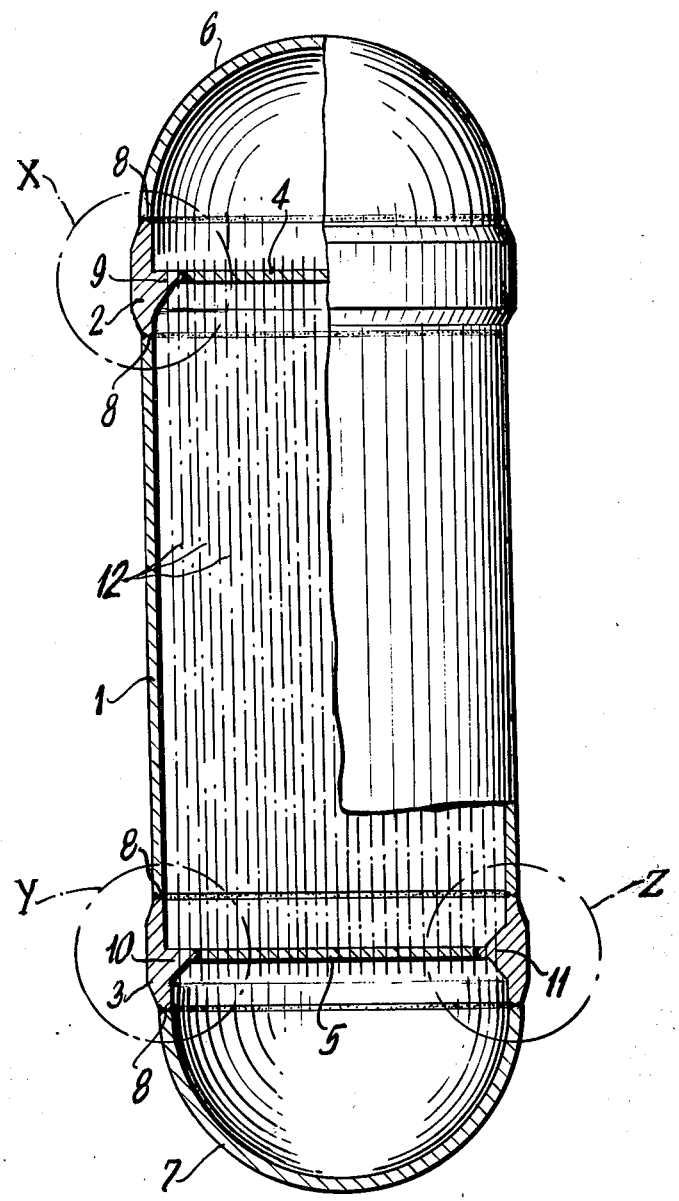
FIG. 1 is a side elevational view, partly in longitudinal section, of a tubular reactor.

In FIG. 1 a tubular reactor or heat exchanger is illustrated consisting of a jacket 1 including reinforced parts or sections 2, 3 at its opposite ends with each of the parts located in the range of a different one of the tube sheets 4, 5. End domes 6, 7 form the opposite ends of the reactor enclosure and the domes are connected to the reinforcing parts 2, 3. Annular welds 8 join the end domes 6, 7 to the reinforcing parts 2, 3 and in turn similar welds 8 interconnect the reinforcing parts with the jacket 1.

Reinforcing parts 2, 3 form the outer part of a reinforcing member, the inner part of which is formed by one of an annular frusto-conically shaped member 9, 10 or 11. The reinforcing member extends radially outwardly from the circumferential periphery of the tube sheet 4. The inner part 9, 10 or 11 of the reinforcing member can be formed in a variety of ways, in the encircled area X the frusto-conical shaped reinforcement provided by the inner part 9 extends from the tube sheet toward the tube bundle, in the encircled area Y the frusto-conically shaped inner part 10 extends from the tube sheet 5 toward the dome 7, and in the encircled area Z the inner part 11 is frusto-conically shaped in both directions from the tube sheet 5, that is toward the tube bundle and toward the dome.

About its radially inner edge, each inner part 9, 10 and 11 has the same thickness as the membrane-like tube plate 4, 5 to which it is welded. On one side each of the inner parts 9, 10 tapers outwardly away from the circumferential periphery of the tube sheet forming the frusto-conical shape. The inner part 11 tapers radially outwardly away from the tube sheet on both sides affording a double frusto-conical configuration. In both of the tube plates 4, 5 and in the reinforcing members incorporating the inner parts 9, 10 and 11, the tube ends of the bundle of tubes 12 are secured in a seal-like manner.

Details of the tubular reactor or heat exchanger, that is, connections for feeding in and removing reaction gases and heat exchange media, have not been illustrated, since they form no part of the invention.

In FIGS. 2-10 sectional views of the encircled portions X, Y and Z of FIG. 1 are shown illustrating the connection between the tube sheet 4, 5, the inner part 9, 10 or 11 of the reinforcing member, and the outer part 2, 3 of the reinforcing member which forms the connection to the jacket 1 and the domes 6, 7. For purposes of simplification, in FIGS. 2-10 the tube sheet is designated as A, the inner part 9, 10 or 11 of the reinforcing member as B, and the outer part 2, 3 of the reinforcing member as C. The designation B is provided with a different subscript numeral in each of the figures with the subscript numeral corresponding to the figure designation.

Figure 2:
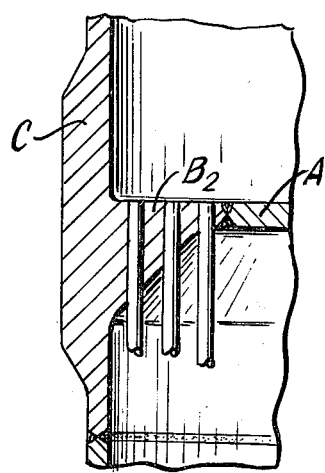
FIGS. 2–4 are cross-sectional views of a portion of the tubular reactor shown in FIG. 1, illustrating a welded connection between the tube sheet and a frusto-conically shaped annular reinforcing member.

In FIG. 2 the tube plate A is welded about its circumferential periphery to the annular inner part $B_2$. The frusto-conical shape of the inner part $B_2$ is provided by the surface tapering radially outwardly and away from the face of the tube sheet A facing toward the tube bundle. The inner part $B_2$ of the reinforcing member forms a portion of a unitary member with the outer part C which forms a reinforcing section for the jacket.

Figure 3:
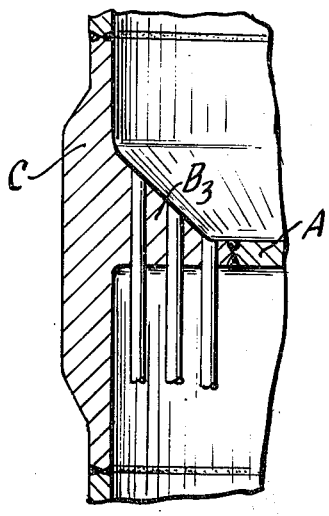

In FIG. 3 the arrangement is similar to that in FIG. 2 with the circumferential periphery of the tube sheet A being welded to the radially inner edge of the inner part $B_3$ of the reinforcing member. The frusto-conically shaped inner part $B_3$, as distinguished from the inner part $B_2$ shown in FIG. 2, has its surface extending radially outwardly from the tube sheet on the side facing toward the dome providing the frusto-conical configuration. The inner part $B_3$ and the outer part C of the reinforcing member are formed as a unitary member.

Figure 4:
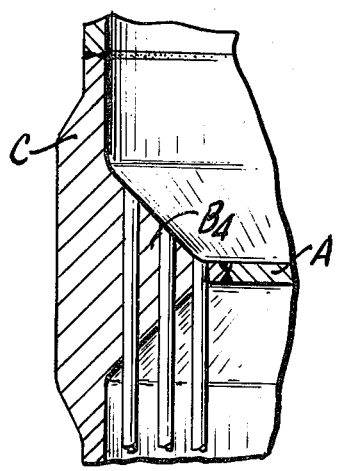

In FIG. 4 the same general arrangement as shown in FIGS. 2 and 3 is provided, that is, the inner part $B_4$ and the outer part C of the reinforcing member form a unitary member. The radially inner edge of the inner part $B_4$ is welded to the circumferential periphery of the tube sheet A. As distinguished from the arrangements shown in FIGS. 2 and 3, however, the inner part B is frusto-conically shaped on both of its surfaces extending radially outwardly from both faces of the tube sheet A. This arrangement affords reinforcement on both sides of the tube sheet.

Figure 5:
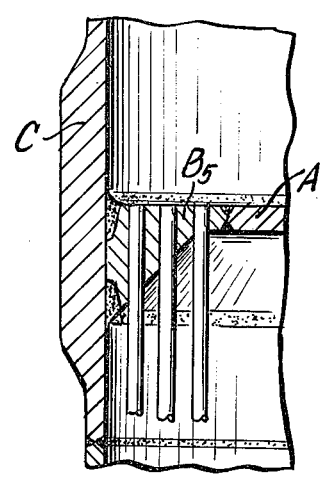
FIGS. 5–7 are views similar to FIGS. 2–4 illustrating a welded connection between the tube sheet and one part of the reinforcing member with another welded connection between the parts of the reinforcing member.

In FIG. 5 the inner part $B_5$ has a frusto-conical configuration similar to that in FIG. 2. The radially inner edge of the inner part $B_5$ is welded to the circumferential periphery of the tube sheet A and the inner part is a separate element from the outer part C and these two parts of the reinforcing member are welded together.

Figure 6:
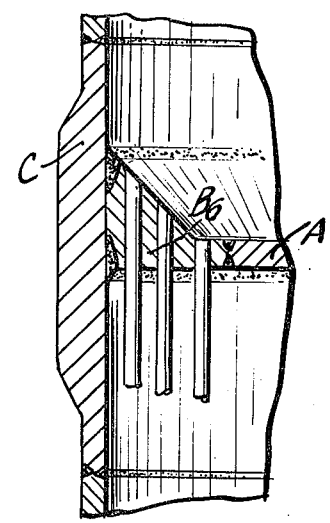

In FIG. 6, the inner part $B_6$ has a frusto-conical configuration similar to that in FIG. 3, however, it is a separate element from the outer part C of the reinforcing member. The radially inner edge of the inner part $B_6$ is welded to the circumferential periphery of the tube sheet A and its radially outer edge is welded to the inner surface of the outer part C.

Figure 7:
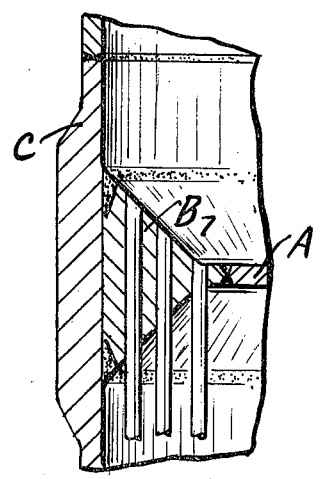

In FIG. 7 the inner part $B_7$ is separate from the outer part C and has a double frusto-conical configuration similar to FIG. 4. The radially inner edge of the inner part $B_7$ is welded to the radially outer edge of the tube part 5 while the radially outer edge of the inner part is welded to the inner surface of the separate outer part C.

Figure 8:
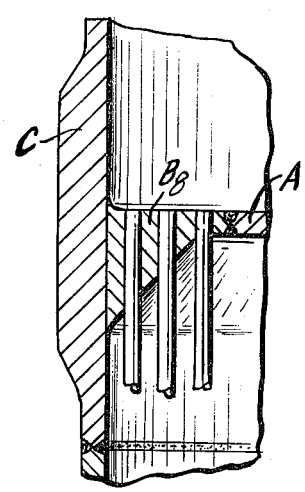
FIGS. 8–10 are views similar to those in FIGS. 2–4 and 5–7 illustrating a welded connection between the tube sheet and the reinforcing member with the inner part of the reinforcing member being formed by buildup welding.

In FIG. 8, the inner part $B_8$ has the same frusto-conical arrangement as shown in FIGS. 2 and 5. The significant difference between the embodiment of FIG. 8 and those shown in FIGS. 2 and 5 is that the inner part $B_8$ is formed by buildup welding on the radially inner surface of the outer part C which forms a reinforcement for the jacket in the range of the tube sheet A. As with the other embodiments, the radially inner edge of the inner part $B_8$ is welded to the radially outer or circumferential peripheral edge of the tube sheet A.

Figure 9:
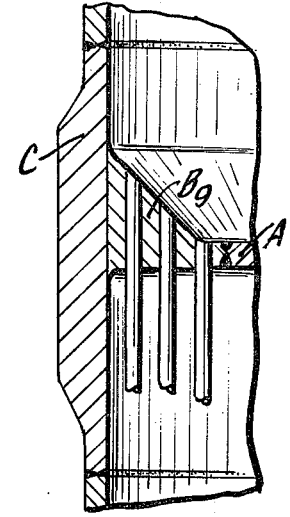

In FIG. 9 the inner part $B_9$ of the reinforcing member is also formed by buildup welding on the radially inner surface of the separate outer part C. The radially inner edge of the inner part $B_9$ is welded to the circumferential peripheral edge of the tube sheet A. The arrangement of the frusto-conical configuration of the inner part $B_9$ is similar to that shown in FIGS. 3 and 6, that is, its surface forming the frusto-conical configuration extends radially outwardly away from the surface of the tube sheet directed toward the end dome or away from the tube bundle.

Figure 10:
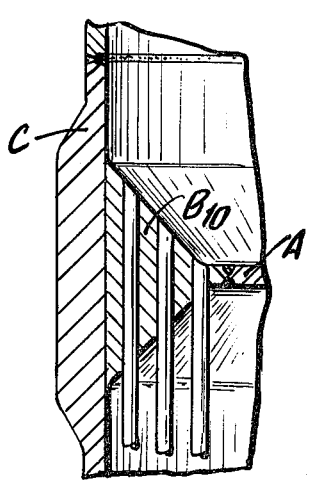

In FIG. 10, the inner part $B_{10}$ is formed by buildup welding on the inner surface of the outer part C in the same manner as shown in FIGS. 8 and 9. The radially inner edge of the inner part $B_{10}$ is welded to the radially outer edge of the tube sheet A. As in the embodiments shown in FIGS. 4 and 7 the inner part $B_{10}$ extends frusto-conically from each of the opposite faces of the tube sheet A.

While specific embodiments of the invention have been shown and described in detail to illustrate the application of the invention principles, it will be understood that the invention may be embodied otherwise without departing from such principles.

What is claimed is:

1. Tube sheet connection for use in vessels containing a bundle of axially extending tubes, such as heat exchanger and reactors, and particularly for large dimensioned vessels operating under high internal pressure conditions, including a relatively thin membranelike tube sheet extending transversely of the axial direction of said tubes and having a circumferential periphery, and a jacket spaced radially outwardly from said tube sheet and extending in the axial direction of and arranged to laterally enclose said bundle of tubes wherein the improvement comprises an annular reinforcing member secured to and extending around and radially outwardly from the circumferential periphery of said tube sheet, said reinforcing member including an inner part having a radially inner side weld connected to said tube sheet and a radially outer side spaced radially outwardly from said inner side, said inner side having a dimension in the axial direction of said tube corresponding substantially to the thickness dimension of said tube sheet and said outer side having a dimension in the axial direction of said tubes considerably greater than the thickness dimension of said tube sheet, an outer part of said reinforcing member is connected to the outer side of said inner part and extends radially outwardly therefrom, said outer part having a thickness greater than and forming a reinforcing continuation of said jacket, said inner part for a portion thereof in the axial direction of said tubes being frusto-conically shaped and having a surface extending obliquely outwardly from said sheet and said inner part having an increasing thickness in the thickness direction of said tube sheet from the radially inner side to the radially outer side thereof.

2. Tube sheet connection, as set forth in claim 1, wherein said tube sheet having a first face directed toward the tube bundle and an oppositely directed second face, and said obliquely extending surface of said inner part extending outwardly from the first face of said tube sheet.

3. Tube sheet connection, as set forth in claim 1, wherein said tube sheet having a first face directed toward the tube bundle and an oppositely directed second face, and said obliquely extending surface of said inner part extending outwardly from the second face of said tube sheet.

4. Tube sheet connection, as set forth in claim 1, wherein said tube sheet having a first face directed toward the tube bundle and an oppositely directed second face, said inner part being frusto-conically shaped on each side extending outwardly from said first and second faces of said tube sheet.

5. Tube sheet connection, as set forth in claim 1, wherein said inner part and said outer part of said reinforcing member comprising a unitary member, and said reinforcing member being welded to the circumferential periphery of said tube sheet.

6. Tube sheet connection, as set forth in claim 1, wherein said inner part and said outer part of said reinforcing member comprising separate parts with the radially inner side of said inner part being welded to the circumferential periphery of said tube plate and with the radially outer side of said inner part being welded to said outer part.

7. Tube sheet connection, as set forth in claim 1, wherein said inner part being weld deposited in a built up manner on said outer part and extending radially inwardly from said outer part and being welded at its radially inner side to the circumferential periphery of said tube sheet.

8. Tube sheet connection, as set forth in claim 1, wherein said tubes are connected to and extend through said tube sheet and said inner part of said reinforcing member.

9. Tube sheet connection, as set forth in claim 1, wherein said outer part of said reinforcing member has a thickness greater than the thickness of said jacket.

10. Tube sheet connection, as set forth in claim 9, wherein the radially inner side of said outer part is aligned with the radially inner surface of said jacket.

* * * * *